March 26, 1940.  D. BRONICO  2,195,022
BEER-DISPENSING SPIGOT
Filed April 25, 1939
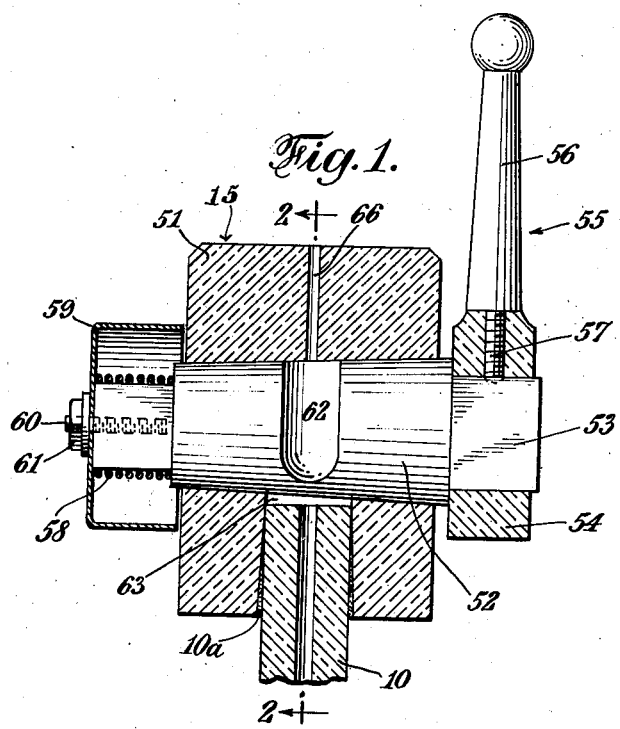
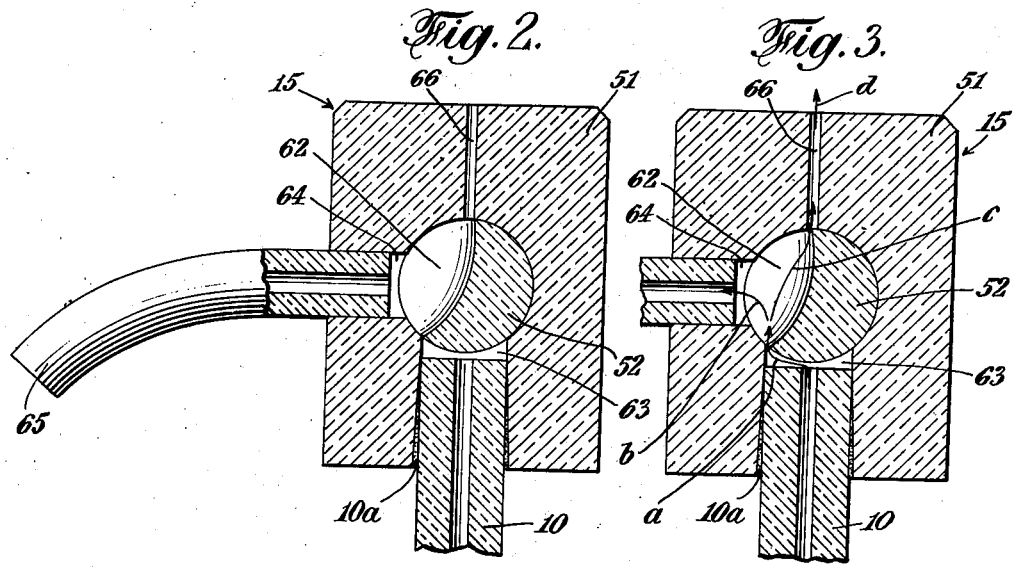
INVENTOR.
Domenico Bronico.
BY
his ATTORNEY.

Patented Mar. 26, 1940

2,195,022

UNITED STATES PATENT OFFICE 2,195,022

BEER-DISPENSING SPIGOT

Domenico Bronico, Tuckahoe, N. Y.

Application April 25, 1939, Serial No. 269,864

1 Claim. (Cl. 225—5)

This invention relates to the dispensing of beverages such as beer, ale and the like, by way of a draft-tube connected direct to a barrel of such beverage, hereinafter referred to as beer.

More particularly, the present invention provides a novel and valuable type of spigot, so constructed and operating that, with the beer delivered at the required low temperature and while under the proper pressure, and desirably by such means that the flavor of the beer is not contaminated by contact with metal, rubber or the like, the beer will be in perfect condition for drinking immediately when drawn by virtue of another quality insured as a result of dispensing the beer from the new spigot. This quality is a certain degree of effervescence. By use of the new spigot each draft of beer drawn can be of the same extent of carbonation, as well as under the same pressure and at the same temperature, in all parts thereof; so that the foam content of each draft delivered, and of all parts of any such draft, can be exactly that prevised according to the temperature and pressure conditions maintained.

The beer when dispensed should be under a pressure of approximately 15 pounds; such pressure being usually maintained by admittance of compressed air to the barrel through a so-called beer-tap coupling. The cooling of the beer, so that it shall reach the spigot at a temperature of approximately 40° F., has been by some kind of refrigeration; a favored way of doing this has been by placing the barrel in a special refrigerating cabinet or chamber.

My copending application Ser. No. 253,313, filed January 28, 1939, for a system of beer dispensing involving the use of a straight draft-tube of glass or other non-flavor-contaminating material, provides means for maintaining the beer, in all parts of the system, not only at the required pressure and temperature, but at a constant pressure and at a constant temperature regardless of whether the draft be the last one drawn by said tube from a barrel to empty the latter or the first one drawn by the same tube from a new barrel substituted for the empty one following disconnection of the tube from the emptied barrel and reconnection of said tube to the substituted barrel.

It is with such a system that the spigot of the present invention is used with greatest advantage; although, as will be understood, the new spigot is not necessarily to be limited to that use.

The present invention, and the various features and advantages thereof, will be clearly understood from the following description of a now preferred form of spigot according to the invention as illustrated in the accompanying drawing.

In said drawing:

Fig. 1 is a view partially in vertical section, and partially in elevation, showing such spigot embodiment, mounted on the upper end of the draft-tube above referred to.

Fig. 2 is also a view in vertical section, but taken on the line 2—2 of Fig. 1, and showing the spigot in closed condition.

Fig. 3 is a view similar to Fig. 2, but showing the spigot partially opened.

Referring now in detail to the exemplifying structure shown in these views, 10 indicates the draft-tube, and 15 the spigot.

The spigot 15, which as shown is mainly made of glass, here includes a block-like casing 51 having a horizontally extending conical opening therethrough in which is set a conical valve-member 52. At its end of larger size, this member 52 has a flattened portion 53 extended beyond the casing 51 for taking an eye-member 54 of a handle 55, said handle also including a main extension 56 carrying a set-screw 57 for locking the handle parts to the valve-member by turning the extension 56 relative to the eye-member 54. The valve-member is held in anti-leak condition in the casing 51, yet rotatable therein, by the action of an expansile spring 58, housed in a cap 59, desirably made of some non-metallic yet non-transparent material like catalin; which cap, hiding the spring, is held in place on the smaller end of the valve-member by a threaded stud 60 set in the glass valve-member and extended through a central opening in the cap 59 to take nuts 61.

A cavity 62 in the valve-member 52 is thus always held in line with a passage 63 leading from the upper end of the draft-tube 10, with a passage 64 leading to a curvilinearly downwardly extending discharge spout 65, and with an auxiliary vertically extending passage 66.

Like the passage 66, the passages 63 and 64 are cylindrical, and any known or suitable type of glass cement, as indicated at 10a, is used to secure the upper end of the draft-tube partially extended into the passage 63. The glass spout 65 can be similarly secured, if desired, where it is partially extended into the passage 64.

Operation:

As the parts are shown in Fig. 2, the spigot is closed, and the cavity 62 in the valve-member 52 is open to the atmosphere through the auxiliary passage 66, such passage hereinafter called, for lack of a better term, the vent. The spigot is now closed because the passages 63 and 64 are out of communication with each other by way of said cavity 62.

The spigot is opened by turning the handle 55 so as to rotate the valve-member 52 as seen in Figs. 2 and 3 in a counter-clockwise direction.

The very first part of this opening movement of the valve-member 52 places the passage 63 in communication with the vent 66, and also in communication with the spout 65; and as the spigot is more and more opened, over a fractional rotation of the valve-member measured along its circumference at the vent 66 by about the full diameter of said vent, the opening from the cavity 52 into the vent is gradually decreased, while, at the same time, the bottom port of the valve, that is, the opening from the passage 63 to the cavity 52, is gradually increased. At about the instant the valve-member 52 has been thus turned so far that it closes the vent 66 at the lower end of the latter, the passage 63 is opened up at the valve-member so as to there have a cross-sectional area substantially equal to that of the bore of the tube 10. This bore is of about the same flow capacity as the channel through the spout 65; in which connection it is pointed out that preferably, because thereby best results have been obtained as to foam control, the cross-sectional area of the vent 66 is, as shown, considerably less than that of the bore of the tube 10.

In the course of opening the valve-member by bringing it from the location shown in Fig. 2 to enough beyond its location shown in Fig. 3 to open the passage 63 sufficiently to give the port in the bottom of the valve established at the upper end of the passage 63 a cross-section at least equal to that of the channel through the spout 65, at the first crack-like opening up of the passages 63 and 64 to the cavity 62 of the valve-member 52, there is an uprush from the draft-tube of $CO_2$ or compressed air or both from the suddenly untrapped column of beer in said tube, as indicated by the arrows $a$, $b$, $c$ and $d$ in Fig. 3. At the very beginning of the opening of the spigot, most of this gas will follow the path indicated by the arrows $a$ and $b$, and issue from the spout 65, despite the angularity of extension of the latter relative to the line of gas outrush, because of the relatively large cross-sectional area of the channel through the spout. Enough of this gas will, however, enter the vent 66 and be discharged from the upper end thereof, as indicated by the arrows $c$ and $d$, to avoid churning or foaming such beer as now may be in the lower part of the cavity 62, and which was left therein following closing of the spigot after completion of the last-preceding draft.

The bar-tender, desirably, will not place a glass below the discharge end of the spout until he notes the spurt therfrom of the very small amount of old beer thus cleaned out of the spigot. As will be understood, this old beer thus disposed of is trifling in quantity, being the amount finally trapped in the spigot after closing the same by returning the valve-member to the position shown in Fig. 2, and being thereafter lessened in volume due to discharge of its $CO_2$ content through the vent 66 and the spout 65 pending another opening of the valve to make the next draft.

When the spigot has been opened to about roughly the extent shown in Fig. 3, the main release of the undesirable or surplus $CO_2$ or compressed air or both is by way of the vent 66. The beer now being drawn issues from the spout 65 with a foam content which is exactly that required; that is, free of undesirably surplus gas, either as to the whole draft, even where a new barrel is being tapped, or over the first part of the draft, which commonly is mostly foam even when not the first draft from a new barrel.

It is exceedingly difficult to determine exactly just how this undesirable gas surplus is handled as between the vent 66 and the spout 65 during the first opening of the spigot; but an attempt has been made to give what is now believed to be the correct detailed explanation of what occurs, based on careful observation of the actual behavior of the spigot.

At any rate, the ordinary bar-tender quickly becomes accustomed to the action of the spigot, and very soon is able so to time his placing of the glass below the discharge end of the spout, relative to the rate at which he is turning the handle 55, to insure that no taste-affecting part of the previously trapped beer in the spigot is delivered to the customer, and at the same time to lose no part of the fresh beer coming from the just-opened draft-tube.

In order to facilitate handling of the spigot, suitable stops (not shown) are provided, as has been common practice in making previous spigots, for limiting the ends of the opening and closing movements of the valve-member 52 of the present spigot.

The draft of beer drawn each time is of the same degree of carbonation in all parts thereof, so that the foam content is exactly that predetermined. The collar of foam at the top of each glass of beer drawn is exactly the same in every case, with a given size of glass, mug or stein; and this can always be exactly as predetermined, as a result of maintaining constant the temperature and pressure factors, and hence the compressed-air and $CO_2$ content of all parts of a draft when the new spigot is used. Due to these constants, and the fact that the beer at no time contacts metal or rubber or other flavor-modifying elements, the first draft of beer, after say an over-night rest of the dispensing system, is the same as any subsequently drawn one, and thus each draft, as to all thereof, can be served to a customer. This avoids the wastage heretofore encountered from combing the collar usually several times in the case of each draft drawn; and amounting to several glasses of beer having to be drawn and discarded before one suitable for delivery to the customer is obtained, after either an over-night shut-down, or following substitution of a new full barrel for an emptied one.

The foam control of the present invention, not only for always serving to a customer more quickly than heretofore a perfect glass of beer, but for eliminating the considerable beer wastage previously inevitable, is assisted materially, so far as is concerned maintaining constant the temperature and pressure factors, by using a glass draft-tube and a glass spigot, in view of the high heat conductivity of glass. Also, by making these parts of glass, the beer is held to its true natural flavor; and the customer is able visually as well as gustatorily to appreciate this, by observation of the flow of the beer through the spigot when the latter is made of clear transparent glass, as is recommended. Indeed, in view of the catalin or like cap 59, the spring 58, desirably made of metal, is wholly hidden, and so this element is not in sight; even though so positioned as not to be at any time in contact with the beer.

While I have shown and described with great particularity of detail what I now believe to be the most practical and satisfactory embodiment of the spigot of the invention, it will be understood that various statements hereinabove are made by way of explaining present preferences and by way of illustration, and not for purposes of limitation, and that the scope of protection contemplated is to be taken solely from the claim following, interpreted as broadly as is consistent with the prior art.

I claim:

A spigot for a beer-dispensing installation of the kind including a draft-tube for connection to a beer barrel maintained cool during drawing off of the beer therefrom and of the kind including means for maintaining the cooled beer under pressure in the barrel and in the tube—characterized by a construction of such spigot such that it comprises a casing having a beer supply port in its bottom to be served from the tube, a discharge spout having an inlet spaced from and above said port, and a vent spaced from said port and said inlet and above the latter; and a rotatable valve-member in said casing having a cavity intermediate the ends of said member and shaped and located so that when said member is in position to close said port it places said vent and said inlet in communication by way of said cavity, and so that, during rotation of said member toward full opening of said port into said cavity, said vent is more and more closed relative to said cavity as said port is more and more opened relative thereto, said vent being of less cross-sectional area than said port, and said cavity including a defining back wall concavely facing said inlet, said wall having a length so extending transverse to said member that when said wall in its bottom portion is backed by a part of said member which closes said port substantially at a side limit thereof closest to said inlet said wall at its top is substantially at a side limit of said vent most remote from said inlet, whereby on rotation of said member to first open up said port to a crack-like extent said vent is closed to a very small extent by the portion of said member backing said wall top, said vent and port being so shaped and located relative to each other and to the top and bottom of said wall that when said member has been rotated to open up the port to substantially the same cross-sectional area as said inlet said vent is wholly closed.

DOMENICO BRONICO.